US009592852B2

United States Patent
Kiyokawa et al.

(10) Patent No.: US 9,592,852 B2
(45) Date of Patent: Mar. 14, 2017

(54) PARKING ASSIST SYSTEM AND PARKING ASSIST METHOD

(71) Applicants: AISIN SEIKI KABUSHIKI KAISHA, Kariya-shi, Aichi-ken (JP); TOYOTA JIDOSHA KABUSHIKI KAISHA, Toyota-shi, Aichi-ken (JP)

(72) Inventors: Yusuke Kiyokawa, Nagoya (JP); Masaya Kato, Toyokawa (JP); Tomohisa Yamashita, Toyohashi (JP); Tomoyuki Matsuba, Obu (JP); Takashi Kuwayama, Nagoya (JP); Motonari Obayashi, Nagakute (JP); Hironobu Ishijima, Toyota (JP); Keisuke Oyama, Toyota (JP)

(73) Assignees: AISIN SEIKI KABUSHIKI KAISHA, Aichi-ken (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/850,184

(22) Filed: Sep. 10, 2015

(65) Prior Publication Data

US 2016/0075327 A1   Mar. 17, 2016

(30) Foreign Application Priority Data

Sep. 12, 2014   (JP) .................................. 2014-186825

(51) Int. Cl.
*B60W 30/06*   (2006.01)
*B62D 15/02*   (2006.01)

(52) U.S. Cl.
CPC ................................ *B62D 15/0285* (2013.01)

(58) Field of Classification Search
USPC .......................................................... 701/301
See application file for complete search history.

(56) References Cited

U.S. PATENT DOCUMENTS

| 2005/0231341 | A1* | 10/2005 | Shimizu | ................ | B60Q 9/005 |
| | | | | | 340/436 |
| 2010/0033348 | A1* | 2/2010 | Kawabata | ................ | B60R 1/00 |
| | | | | | 340/932.2 |

FOREIGN PATENT DOCUMENTS

| JP | 2000-177512 A | 6/2000 |
| JP | 2014091351 A | 5/2014 |
| JP | 2014117989 A | 6/2014 |

OTHER PUBLICATIONS

Communication dated Aug. 2, 2016, from the Japanese Patent Office in counterpart application No. 2014-186825.

* cited by examiner

*Primary Examiner* — Anne M Antonucci
(74) *Attorney, Agent, or Firm* — Sughrue Mion, PLLC

(57) ABSTRACT

A parking assist system includes an electronic control unit. The electronic control unit is configured to detect an obstacle. The electronic control unit is configured to determine a target position of a moving path of a vehicle. The electronic control unit is configured to determine the target position at a position at which the vehicle is spaced at least a predetermined distance from the obstacle higher than a first threshold and the vehicle overlaps with the obstacle lower than the first threshold.

10 Claims, 10 Drawing Sheets

F I G . 10
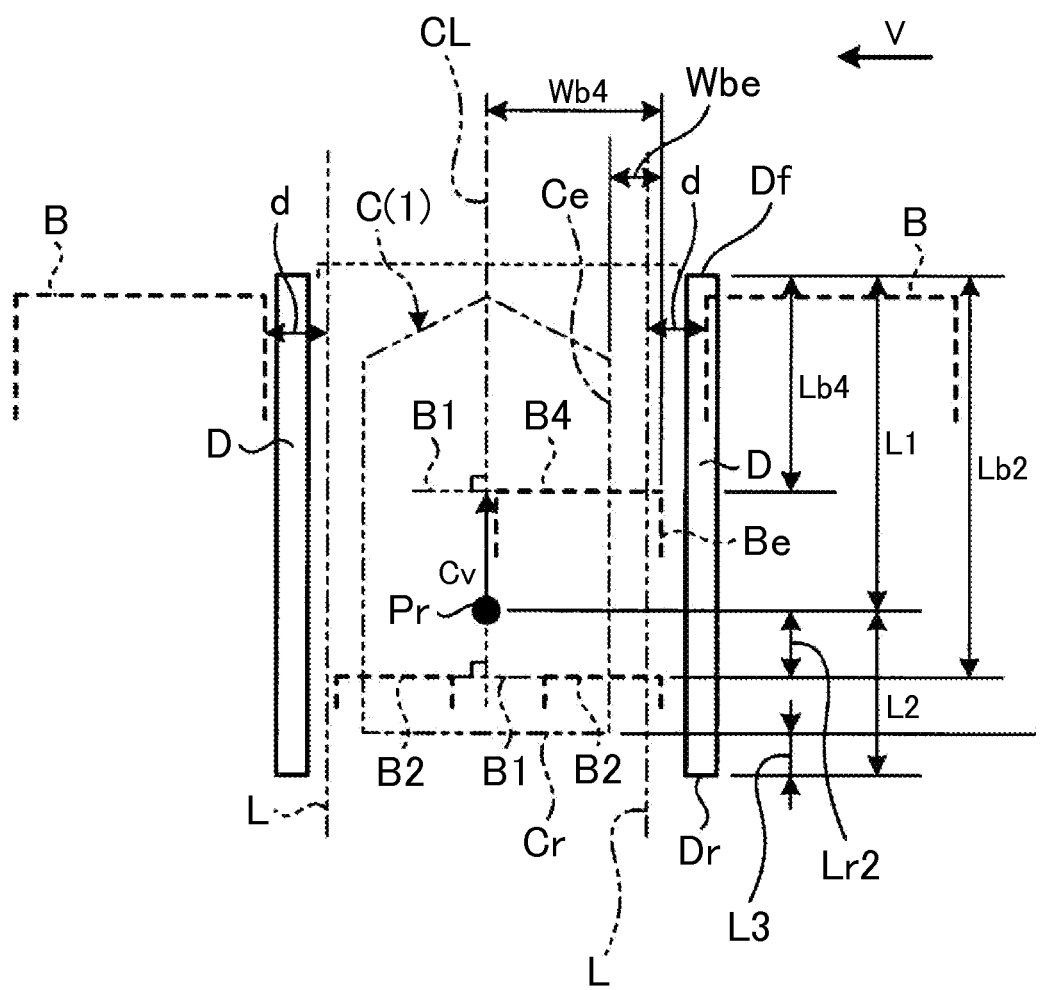

PARKING ASSIST SYSTEM AND PARKING ASSIST METHOD

INCORPORATION BY REFERENCE

The disclosure of Japanese Patent Application No. 2014-186825 filed on Sep. 12, 2014 including the specification, drawings and abstract is incorporated herein by reference in its entirety.

BACKGROUND OF THE INVENTION

1. Field of the Invention

The invention relates to a parking assist system and a parking assist method.

2. Description of Related Art

There is known a parking assist system that determines a parking target position on the basis of detected results of ultrasonic sensors (for example, Japanese Patent Application Publication No. 2000-177512 (JP 2000-177512 A)).

SUMMARY OF THE INVENTION

It is desirable to obtain a parking assist system that is able to determine a target position at a less inconvenient position even when there is an obstacle, such as a sprag, within a parking space.

A first aspect of the invention provides a parking assist system. The parking assist system includes an electronic control unit. The electronic control unit is configured to detect an obstacle. The electronic control unit is configured to determine a target position of a moving path of a vehicle. The electronic control unit is configured to determine the target position at a position at which the vehicle is spaced at least a predetermined distance from the obstacle higher than a first threshold and the vehicle overlaps with the obstacle lower than the first threshold.

A second aspect of the invention provides a parking assist method. The parking assist method includes: detecting an obstacle; determining a target position of a moving path of a vehicle; and determining the target position at a position at which the vehicle is spaced at least a predetermined distance from the obstacle higher than a first threshold and the vehicle overlaps with the obstacle lower than the first threshold.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is an exemplary perspective view of a vehicle according to an embodiment in a state where part of a cabin is seen through;

FIG. 10 is a schematic plan view of an example of a set candidate position of a target position and obstacles and parking boundaries detected by the parking assist system according to the embodiment.

DETAILED DESCRIPTION OF EMBODIMENTS

Hereinafter, an exemplary embodiment of the invention will be described. The configuration of the embodiment described below, and the operation, results and advantageous effects obtained from the configuration are illustrative. The invention may be implemented by a configuration other than the configuration that will be described in the following embodiment, and may obtain at least one of various advantageous effects based on a basic configuration or secondary advantageous effects.

A vehicle 1 according to the present embodiment may be, for example, an automobile that uses an internal combustion engine (not shown) as a drive source, that is, an internal combustion engine automobile, may be an automobile that uses an electric motor (not shown) as a drive source, that is, an electric automobile, a fuel-cell automobile, or the like, may be a hybrid automobile that uses both the internal combustion engine and the electric motor as drive sources, or may be an automobile including another drive source. Various transmissions may be mounted on the vehicle 1. Various devices, such as system and components, required to drive an internal combustion engine or an electric motor may be mounted on the vehicle 1. The system, number, layout, and the like, of a device related to driving of wheels 3 in the vehicle 1 may be variously set.

Figure 1:
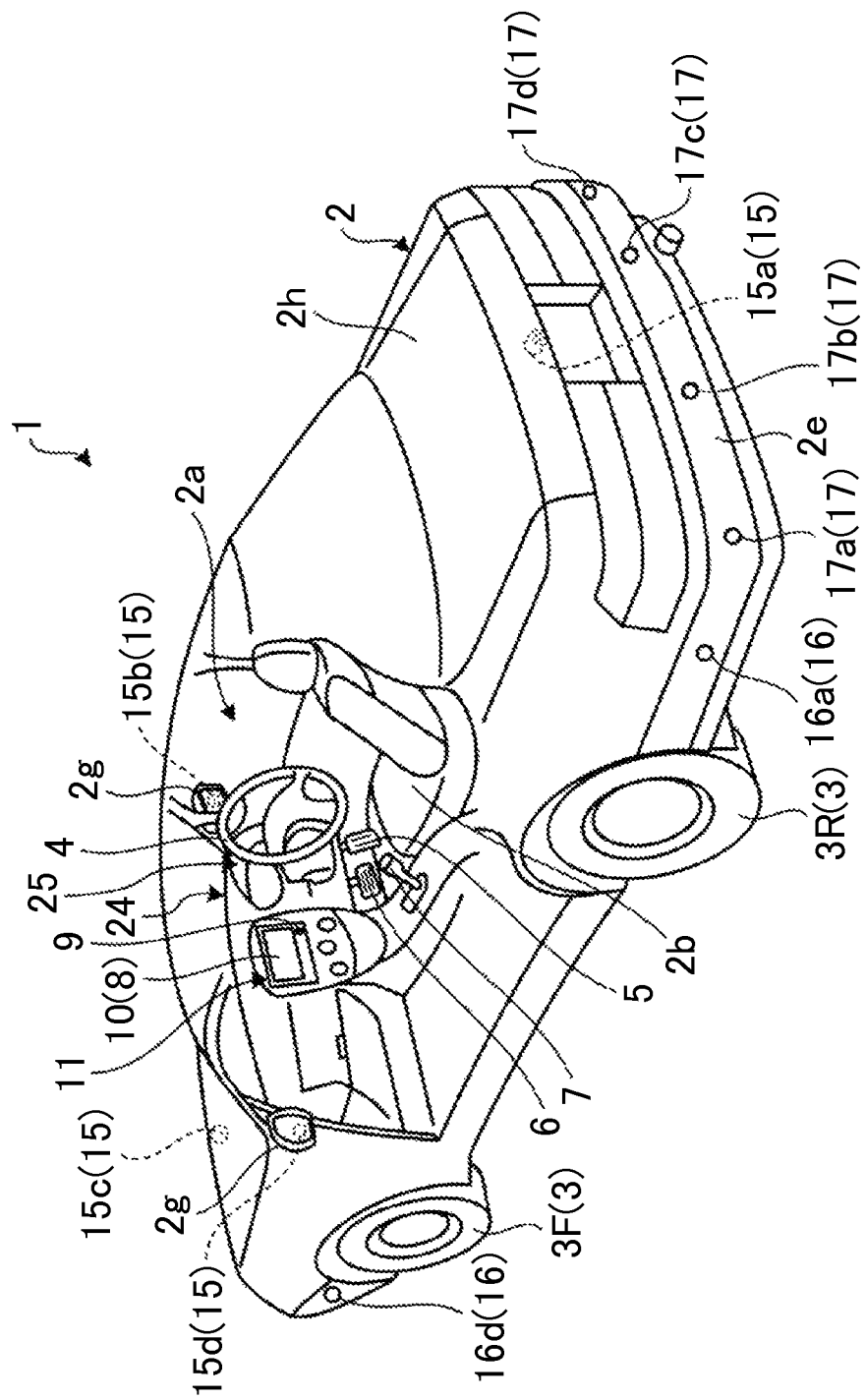

As illustrated in FIG. 1, a vehicle body 2 constitutes a cabin 2a in which an occupant (not shown) is seated. A steering unit 4, an accelerator operation unit 5, a brake operation unit 6, a shift operation unit 7, and the like, are provided near a seat 2b of a driver as an occupant inside the cabin 2a. The steering unit 4 is, for example, a steering wheel projecting from a dashboard 24. The accelerator operation unit 5 is, for example, an accelerator pedal located near driver's foot. The brake operation unit 6 is, for example, a brake pedal located near driver's foot. The shift operation unit 7 is, for example, a shift lever projecting from a center console. The steering unit 4, the accelerator operation unit 5, the brake operation unit 6, the shift operation unit 7, and the like, are not limited to these components.

A display device 8 and an audio output device 9 are provided inside the cabin 2a. The display device 8 serves as a display output unit. The audio output device 9 serves as an audio output unit. The display device 8 is, for example, a liquid crystal display (LCD), an organic electroluminescent display (OELD), or the like. The audio output device 9 is, for example, a speaker. The display device 8 is, for example, covered with a translucent operation input unit 10, such as a touch panel. An occupant is allowed to visually recognize an image that is displayed on the display screen of the display device 8 via the operation input unit 10. An occupant is allowed to perform an input operation by operating the operation input unit 10 through touching, pressing or moving the operation input unit 10 with a finger, or the like, at a position corresponding to an image that is displayed on the display screen of the display device 8. These display device 8, audio output device 9, operation input unit 10, and the like, are, for example, provided in a monitor device 11 located at the center in the vehicle width direction, that is, transverse direction, of the dashboard 24. The monitor device 11 may have an operation input unit (not shown), such as a switch, a dial, a joystick and a push button. An audio output device (not shown) may be provided at another position inside the cabin 2a, different from the monitor device 11. Audio may be output from the audio output device 9 of the monitor device 11 and another audio output device. The monitor device 11 is, for example, shared with a navigation system or an audio system.

Figure 3:
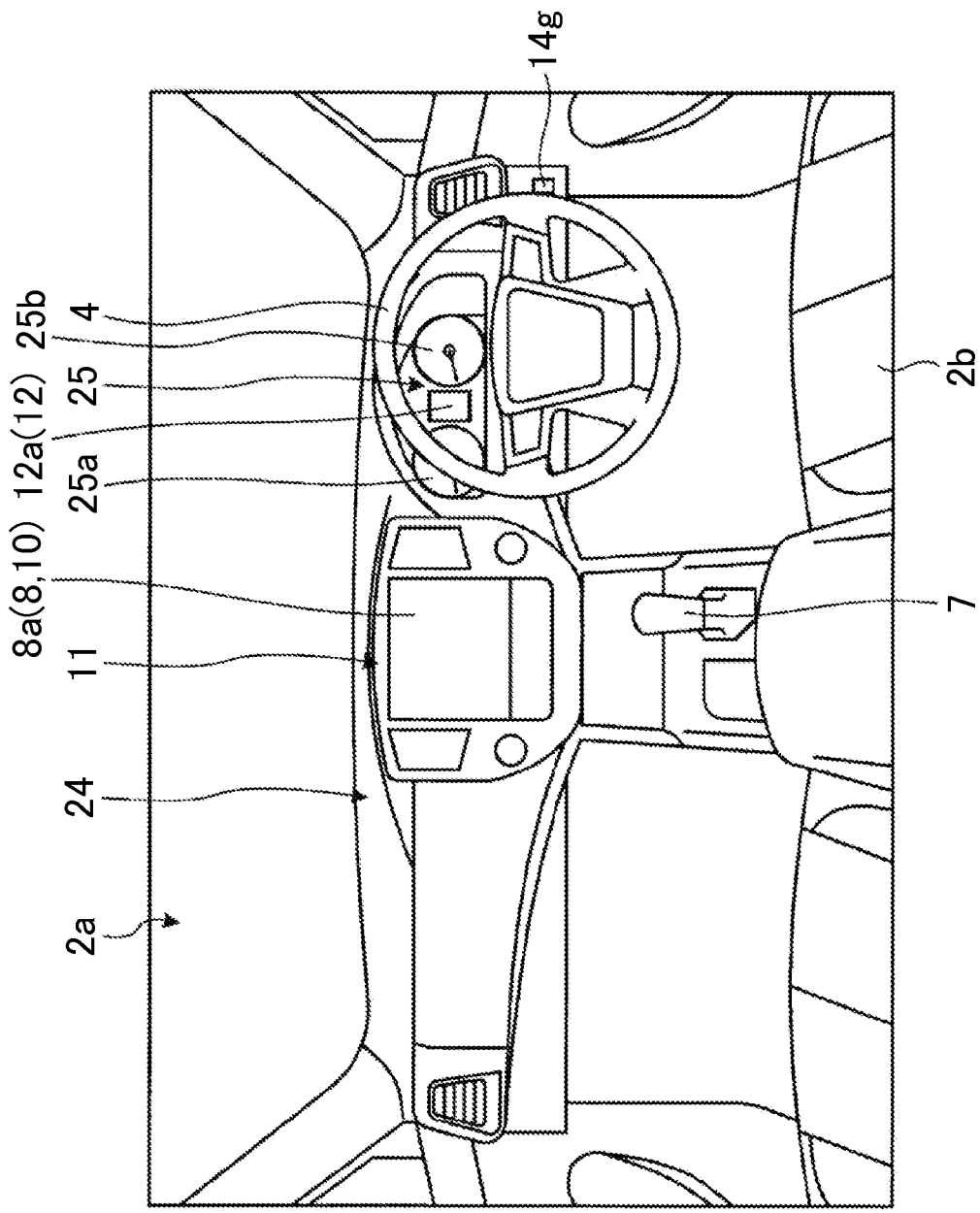
FIG. 3 is a view of an example of a dashboard of the vehicle according to the embodiment when viewed from the rear side of the vehicle.

A display device 12 different from the display device 8 is provided inside the cabin 2a. As shown in FIG. 3, the display device 12 is, for example, provided in an instrument panel unit 25 in the dashboard 24, and is located at substantially the center of the instrument panel unit 25 between a speed indicating unit 25a and a rotation speed indicating unit 25b. The size of the screen 12a of the display device 12 is smaller than the size of the screen 8a of the display device 8. An image that shows information for assisting in parking the vehicle 1 may be mainly displayed on the display device 12. The amount of information that is displayed on the display device 12 may be smaller than the amount of information that is displayed on the display device 8. The display device 12 is, for example, an LCD, an OELD, or the like. Information that is displayed on the display device 12 may be displayed on the display device 8.

Figure 2:
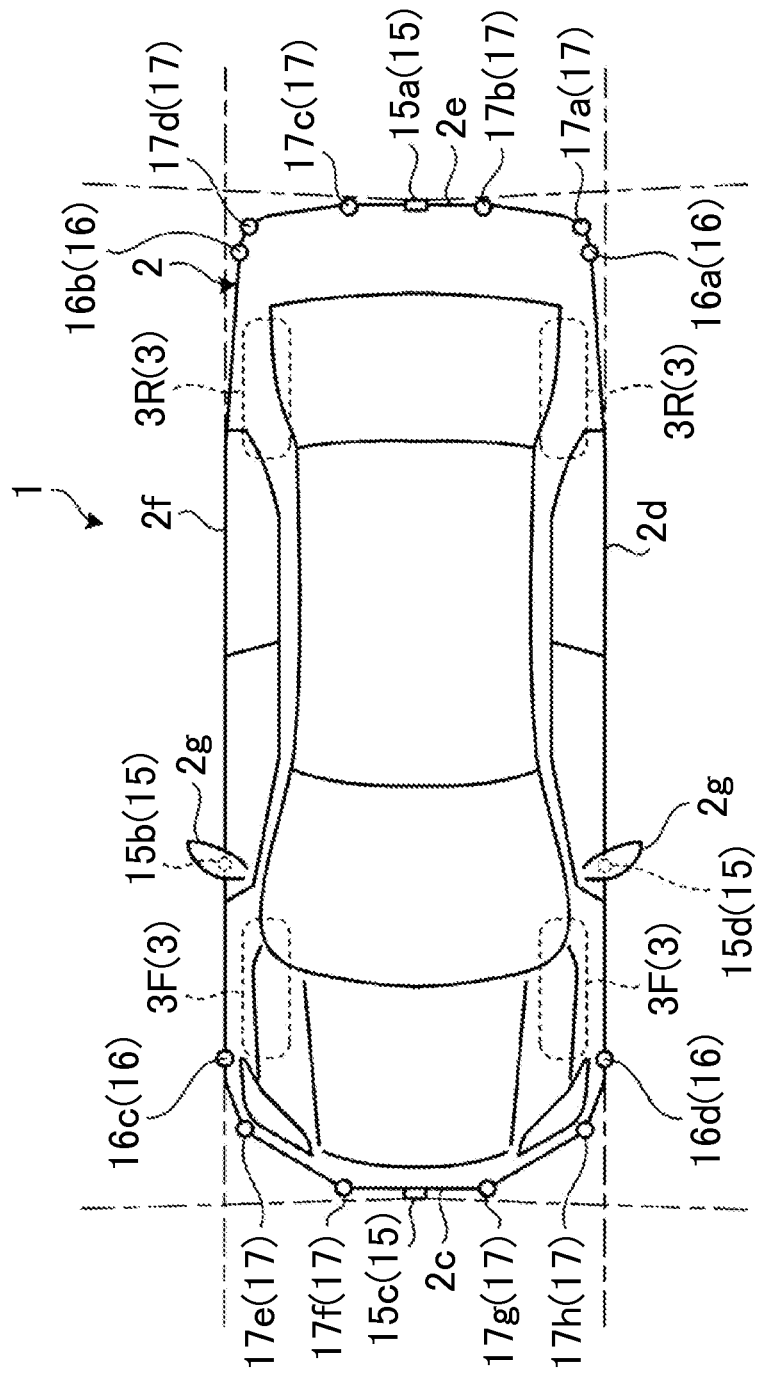
FIG. 2 is an exemplary plan view (bird's-eye view) of the vehicle according to the embodiment.
Figure 4:
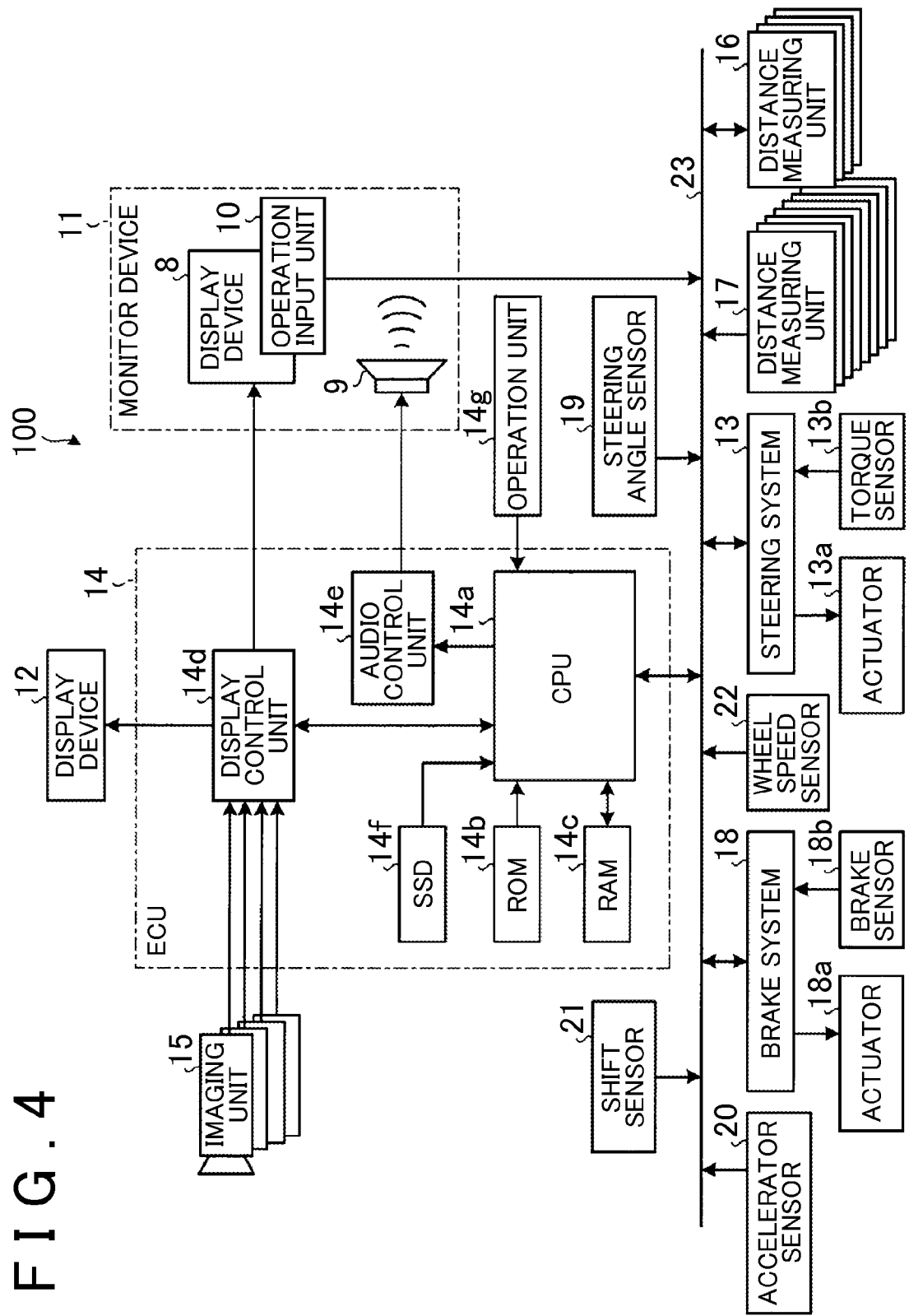
FIG. 4 is an exemplary block diagram of the configuration of a parking assist system according to the embodiment.

As illustrated in FIG. 1 and FIG. 2, the vehicle 1 is, for example a four-wheel vehicle, and includes two right and left front wheels 3F and two right and left rear wheels 3R. Each of these four wheels 3 may be configured to be steerable. As illustrated in FIG. 4, the vehicle 1 includes a steering system that steers at least two of the wheels 3. The steering system 13 includes an actuator 13a and a torque sensor 13b. The steering system 13 is electrically controlled by an electronic control unit (ECU) 14, or the like, to actuate the actuator 13a. The steering system 13 is, for example, an electric power steering system, a steer-by-wire (SBW) system, or the like. The steering system 13 adds torque, that is, assist torque, to the steering unit 4 with the use of the actuator 13a to compensate for steering force or steers the wheels 3 with the use of the actuator 13a. In this case, the actuator 13a may steer one of the wheels 3 or may steer a plurality of the wheels 3. The torque sensor 13b, for example, detects a torque that is applied to the steering unit 4 by a driver.

As illustrated in FIG. 2, for example, four imaging units 15a to 15d are provided on the vehicle body 2 as a plurality of imaging units 15. Each of the imaging units 15 is, for example, a digital camera that incorporates an imaging device, such as a charge coupled device (CCD) and a CMOS image sensor (CIS). Each of the imaging units 15 is able to output moving image data at a predetermined frame rate. Each of the imaging units 15 has a wide angle lens or a fisheye lens, and is able to capture an image in, for example, the range of 140° to the range of 190° in the horizontal direction. The optical axis of each of the imaging units 15 is set so as to be oriented obliquely downward. Thus, each of the imaging units 15 sequentially captures a road surface on which the vehicle 1 is allowed to move and an outside environment around the vehicle body 2, including an area in which the vehicle 1 is allowed to be parked, and outputs the captured image as captured image data.

The imaging unit 15a is, for example, located at a rear end 2e of the vehicle body 2, and is provided at a lower wall portion of a door 2h of a rear boot. The imaging unit 15b is, for example, located at a right-side end 2f of the vehicle body 2, and is provided at a right-side door mirror 2g. The imaging unit 15c is, for example, located at the front of the vehicle body 2, that is, a front end 2c in the vehicle longitudinal direction, and is provided at a front bumper, or the like. The imaging unit 15d is, for example, located at the left side of the vehicle body 2, that is, a left-side end 2d in the vehicle width direction, and is provided at a door mirror 2g that serves as a left-side projecting portion. The ECU 14 is able to generate an image having a wider viewing angle or generate an imaginary bird's-eye image of the vehicle 1 from above by executing operation processing and image processing on the basis of the image data obtained by the imaging units 15. A bird's-eye image may be referred to as plan image.

The ECU 14 identifies partition lines, or the like, on a road surface around the vehicle 1 from the images of the imaging units 15, and detects (extracts) parking spaces indicated by the partition lines, or the like.

As illustrated in FIG. 1 and FIG. 2, for example, four distance measuring units 16a to 16d and eight distance measuring units 17a to 17h are provided on the vehicle body 2 as a plurality of distance measuring units 16, 17. Each of the distance measuring units 16, 17 is, for example, a sonar that emits ultrasonic wave and captures the reflected wave. The sonar may also be referred to as a sonar sensor or an ultrasonic detector. The ECU 14 is able to detect whether there is an object, such as an obstacle, located around the vehicle 1 or measure a distance to the object on the basis of the detected results of the distance measuring units 16, 17. That is, each of the distance measuring units 16, 17 is an example of a detection unit that detects an object. Each of the distance measuring units 17 may be, for example, used to detect an object at a relatively close distance. Each of the distance measuring units 16 may be, for example, used to detect an object at a relatively long distance, which is distant from an object that each of the distance measuring units 17 detects. The distance measuring units 17 may be, for example, used to detect an object ahead of or behind the vehicle 1. The distance measuring units 16 may be, for example, used to detect an object to the side of the vehicle 1.

As illustrated in FIG. 4, in a parking assist system 100, in addition to the ECU 14, the monitor device 11, the steering system 13, the distance measuring units 16, 17, and the like, a brake system 18, a steering angle sensor 19, an accelerator sensor 20, a shift sensor 21, a wheel speed sensor 22, and the like, are electrically connected to one another via an in-vehicle network 23 that serves as an electric communication line. The in-vehicle network 23 is, for example, provided as a controller area network (CAN). The ECU 14 is able to control the steering system 13, the brake system 18, and the like, by transmitting control signals through the in-vehicle network 23. The ECU 14 is able to receive detected results of the torque sensor 13b, a brake sensor 18b, the steering angle sensor 19, the distance measuring units 16, the distance measuring units 17, the accelerator sensor 20, the shift sensor 21, the wheel speed sensor 22, and the like, and operation signals of the operation input unit 10, and the like, via the in-vehicle network 23.

The ECU 14, for example, includes a central processing unit (CPU) 14a, a read only memory (ROM) 14b, a random access memory (RAM) 14c, a display control unit 14d, an audio control unit 14e, a solid state drive or flash memory (SSD) 14f, and the like. The CPU 14a is, for example, able to execute various operation processing and control, such as image processing related to images that are displayed on the display devices 8, 12, determination of a target position of the vehicle 1, computation of a moving path of the vehicle 1, determination as to whether there is an interference with an object, automatic control over the vehicle 1, and cancellation of automatic control. The CPU 14a is able to read a program installed and stored in a nonvolatile storage device, such as the ROM 14b, and execute operation processing in accordance with the program. The RAM 14c temporarily stores various pieces of data that are used for computation in the CPU 14a. The display control unit 14d mainly executes image processing by the use of image data obtained by the imaging units 15, synthesis of image data that are displayed on the display device 8, and the like, within the operation processing in the ECU 14. The audio control unit 14e mainly processes audio data that are output from the audio output device 9 within the operation processing in the ECU 14. The SSD 14f is a rewritable nonvolatile storage unit, and is able to store data even when the power of the ECU 14 is turned off. The CPU 14a, the ROM 14b, the RAM 14c, and the like, may be integrated within the same package. The ECU 14 may be formed of another logical operation processor, such as a digital signal processor (DSP), a logical circuit, or the like, instead of the CPU 14a. A hard disk drive (HDD) may be provided instead of the SSD 14f. The SSD 14f or the HDD may be provided separately from the ECU 14. The ECU 14 is an example of an electronic control unit of a parking assist system.

The brake system 18 is, for example, an anti-lock brake system (ABS) that prevents the brake from locking up the wheels, a side slip prevention device (electronic stability control (ESC)) that prevents a side slip of the vehicle 1 during cornering, an electric brake system that enhances brake force (performs brake assist), a brake-by-wire (BBW), or the like. The brake system 18 imparts braking force to the wheels 3 and, by extension, the vehicle 1, via the actuator 18a. The brake system 18 is able to execute various controls by detecting locking up of the wheels by the brake, a spin of the wheels 3, a sign of a side slip, and the like, from, for example, a rotation difference between the right and left wheels 3. The brake sensor 18b is, for example, a sensor that detects the position of a movable unit of the brake operation unit 6. The brake sensor 18b is able to detect the position of the brake pedal that serves as the movable unit. The brake sensor 18b includes a displacement sensor.

The steering angle sensor 19 is, for example, a sensor that detects a steering amount of the steering unit 4, such as the steering wheel. The steering angle sensor 19 is, for example, provided by using a Hall element, or the like. The ECU 14 acquires a driver's steering amount of the steering unit 4, a steering amount of each wheel 3 during automatic steering, or the like, from the steering angle sensor 19, and executes various controls. The steering angle sensor 19 detects a rotation angle of a rotating portion included in the steering unit 4. The steering angle sensor 19 is an example of an angle sensor.

The accelerator sensor 20 is, for example, a sensor that detects the position of a movable unit of the accelerator operation unit 5. The accelerator sensor 20 is able to detect the position of the accelerator pedal that serves as the movable unit. The accelerator sensor 20 includes a displacement sensor.

The shift sensor 21 is, for example, a sensor that detects the position of a movable unit of the shift operation unit 7. The shift sensor 21 is able to detect the position of a lever, an arm, a button, or the like, that serves as the movable unit. The shift sensor 21 may include a displacement sensor or may be provided as a switch.

The wheel speed sensor 22 is a sensor that detects a rotation amount or rotation speed of each wheel 3 per unit time. The wheel speed sensor 22 outputs a wheel speed pulse number, indicating the detected rotation speed, as a sensor value. The wheel speed sensor 22 may be, for example, provided by using a Hall element, or the like. The ECU 14 computes a moving amount, and the like, of the vehicle 1 on the basis of the sensor value acquired from the wheel speed sensor 22, and executes various controls. There is a case where the wheel speed sensor 22 is provided in the brake system 18. In this case, the ECU 14 acquires the detected result of the wheel speed sensor 22 via the brake system 18.

The configurations, arrangement, electrical connection modes, and the like, of the above-described various sensors and actuators are illustrative, and may be variously set (changed).

Figure 5:
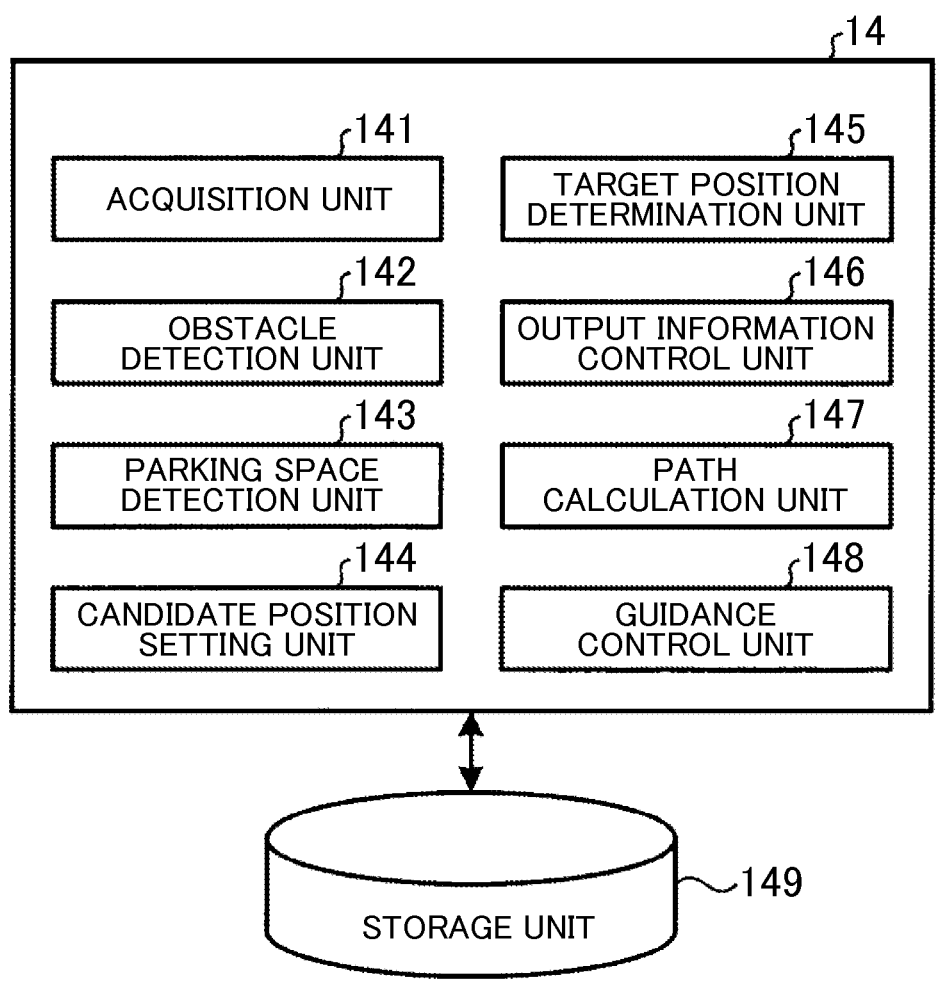
FIG. 5 is an exemplary block diagram of the configuration of part of an ECU of the parking assist system according to the embodiment.

As shown in FIG. 5, the ECU 14 includes an acquisition unit 141, an obstacle detection unit 142, a parking space detection unit 143, a candidate position setting unit 144, a target position determination unit 145, an output information control unit 146, a path calculation unit 147, a guidance control unit 148, an orientation setting unit 150, a storage unit 149, and the like. The CPU 14a functions as the acquisition unit 141, the obstacle detection unit 142, the parking space detection unit 143, the candidate position setting unit 144, the target position determination unit 145, the output information control unit 146, the path calculation unit 147, the guidance control unit 148, the orientation setting unit 150, or the like, by executing a process in accordance with a corresponding program. Data that are used in operation processes of the units, data of results in operation processes, and the like, are stored in the storage unit 149. At least part of the functions of the above-described units may be implemented by hardware.

The acquisition unit 141 acquires various pieces of data, signal, and the like. The acquisition unit 141, for example, acquires data, signals, and the like, such as detected results of the sensors, input operations, input commands, and image data. The acquisition unit 141 is able to acquire a signal resulting from an input operation of the operation unit 14g. The operation unit 14g is, for example, a push button, a switch, or the like.

The obstacle detection unit 142 detects an obstacle that interferes with traveling of the vehicle 1. The obstacle is, for example, another vehicle, a wall, a fence, a pole, a protrusion, a step, a sprag, an object, or the like. The obstacle detection unit 142 is able to detect whether there is an obstacle, the height of an obstacle, the size of an obstacle, and the like, by the use of various techniques. The obstacle detection unit 142 is, for example, able to detect an obstacle on the basis of detected results of the distance measuring units 16, 17. Each of the distance measuring units 16, 17 is able to detect an object corresponding to the height of its beam and is not able to detect an object lower than the height of the beam. Thus, the obstacle detection unit 142 is able to detect the height of an obstacle on the basis of the detected results of the distance measuring units 16, 17 and the heights of beams of the distance measuring units 16, 17. The obstacle detection unit 142 may detect whether there is an obstacle or the height of an obstacle on the basis of a detected result of the wheel speed sensor 22 or an acceleration sensor (not shown) and detected results of the distance measuring units 16, 17. The obstacle detection unit 142 may, for example, detect the height of an obstacle through image processing based on images captured by the imaging units 15.

The parking space detection unit 143 detects a parking space that is provided as a mark or an object. The parking space is a space that is a target or reference set such that the vehicle 1 is parked in that place. A parking boundary is a boundary or outer periphery of the parking space, and is, for example, a partition line, a frame line, a straight line, a band, a step, an edge of any one of them, or the like. That is, the parking boundary is a mark, an object, or the like. The parking space detection unit 143 is, for example, able to detect a parking space and a parking boundary through image processing based on images captured by the imaging units 15. The parking space detection unit 143 is an example of a parking boundary detection unit.

The candidate position setting unit 144 sets at least one candidate position that is a candidate for a target position, that is, a terminal position of a moving path of the vehicle 1. The candidate position setting unit 144, for example, sets a candidate position on the basis of at least one of a detected result of the obstacle detection unit 142 or a detected result of the parking space detection unit 143.

The target position determination unit 145 determines a target position from among at least one candidate position. The target position determination unit 145 is, for example, able to determine a high-rank candidate position, that is, an upper-level candidate position, as a target position, from among at least one candidate position ranked on the basis of a predetermined condition. The target position determination unit 145 is, for example, able to determine a candidate position corresponding to an occupant's input operation, that is, a candidate position selected by the occupant, as a target position from among at least one candidate position.

The output information control unit 146, for example, controls the display control unit 14*d* or the audio control unit 14*e*, by extension, the display device 8, the display device 12 or the audio output device 9, such that the display device 8, the display device 12 or the audio output device 9 outputs intended information in an intended mode at each of steps, such as a start of parking assist, an end of parking assist, determination of a target position, calculation of a path and guidance control.

The path calculation unit 147, for example, calculates a moving path from the current position of the vehicle 1 to the target position on the basis of the current position of the vehicle 1, that is, the host vehicle, the determined target position, the detected obstacle, and the like.

The guidance control unit 148 controls the portions such that the vehicle 1 moves along the calculated moving path. In the vehicle 1 that moves by the use of creeping, or the like, without operating the accelerator pedal, the guidance control unit 148 is, for example, able to move the vehicle 1 along the moving path by controlling the steering system 13 in response to the position of the vehicle 1. The guidance control unit 148 may control not only the steering system 13 but also a drive mechanism, such as an engine and a motor, the brake system 18 that serves as a braking mechanism, or the like. The guidance control unit 148 may, for example, inform the driver of movement of the vehicle 1 along the moving path through display output or audio output commensurate with the position of the vehicle 1 by controlling the output information control unit 146, the display control unit 14*d* or the audio control unit 14*e*, by extension, the display device 8, the display device 12 or the audio output device 9.

The storage unit 149 stores data that are used in computation in the ECU 14 or data calculated in computation in the ECU 14.

Figure 6:
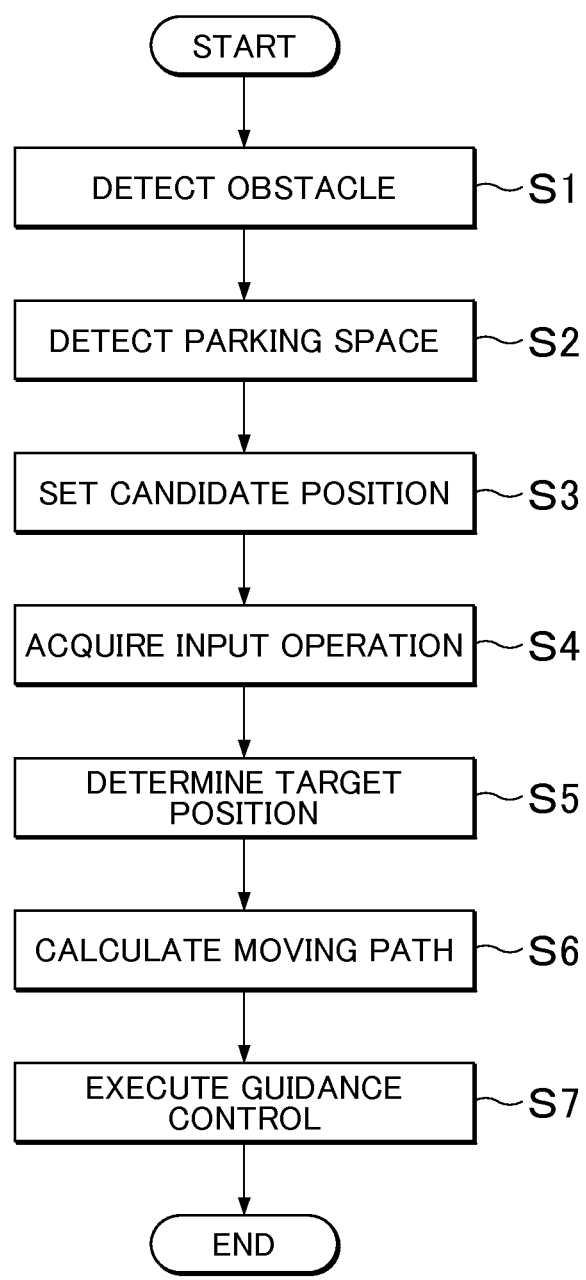
FIG. 6 is a flowchart that shows an example of the procedure of a process that is executed by the parking assist system according to the embodiment.

In the parking assist system 100, a process is executed in accordance with the procedure illustrated in FIG. 6. Initially, the obstacle detection unit 142 detects an obstacle (S1), and the parking space detection unit 143 detects a parking space and a parking boundary (S2). Subsequently, the candidate position setting unit 144 sets at least one candidate position that is a candidate for a target position, that is, terminal position, of the moving path of the vehicle 1 on the basis of the detected results of S1 and S2 (S3). Subsequently, the acquisition unit 141 acquires an input operation that issues a command to start parking assist (S4). That is, in the present embodiment, for example, before an operation command is input, S1 to S3 are executed. Subsequently, the target position determination unit 145 determines a target position from among at least one candidate position (S5). In S5, the target position determination unit 145 is able to rank each of the at least one candidate position, and determine the highest-rank candidate position as the target position. Alternatively, the target position determination unit 145 may determine a candidate position, selected on the basis of an occupant's input operation, as the target position. Subsequently, the path calculation unit 147 calculates a moving path from the current position of the vehicle 1 to the determined target position (S6). Subsequently, the guidance control unit 148 controls the portions such that the vehicle 1 moves along the calculated moving path (S7). The target position, the moving path, or the like, may be corrected or updated as needed in the middle of movement of the vehicle 1 along the moving path.

Figure 7:
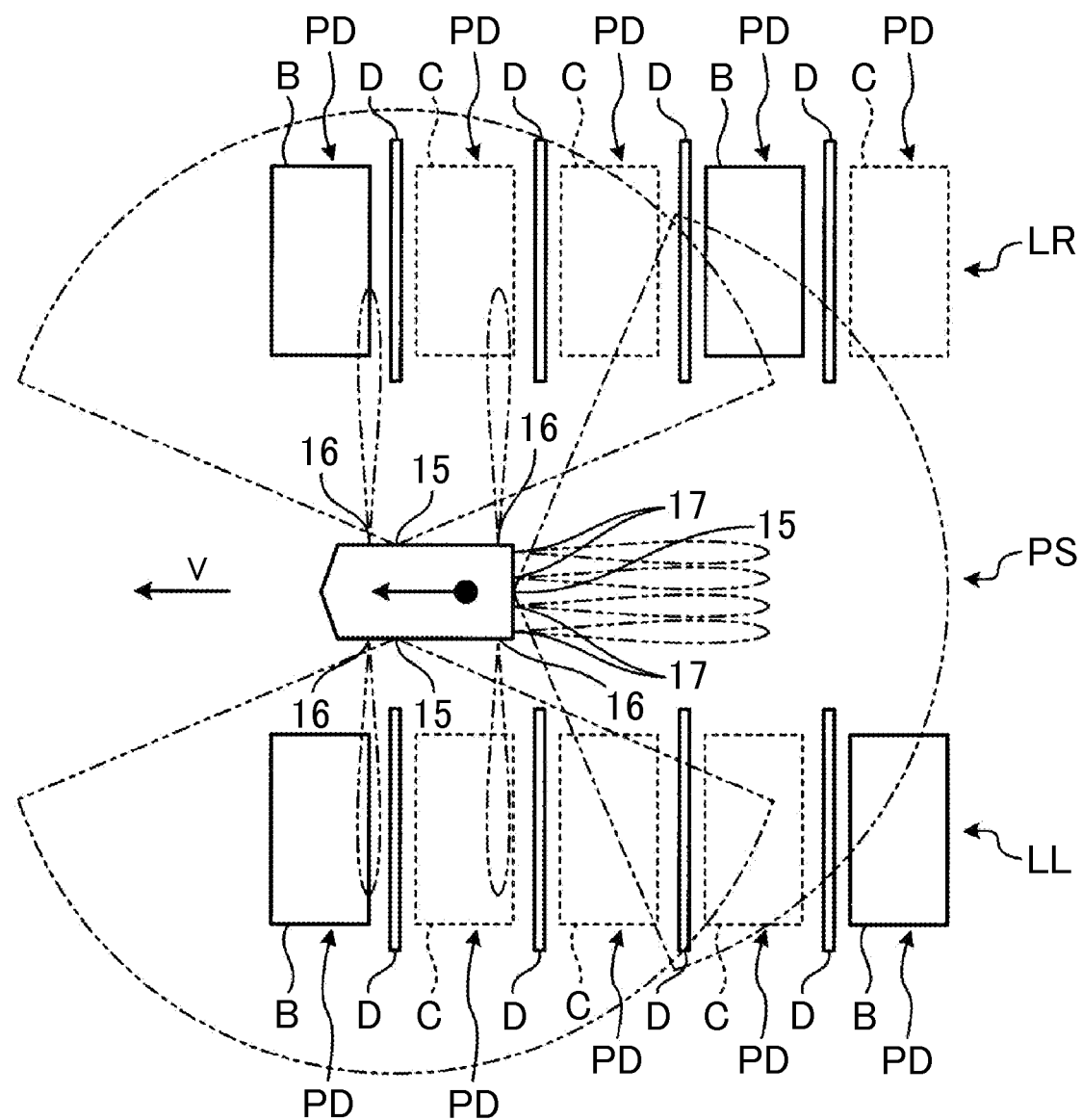
FIG. 7 is a schematic and exemplary plan view that shows an example of a parking place to which the parking assist system according to the embodiment is applicable.

As illustrated in FIG. 7, while the vehicle 1 is passing through a passage PS, the ECU 14 is able to detect obstacles B, parking boundaries D, and the like, located to the side or rear side of the vehicle 1, on the basis of image data captured by the imaging units 15 and detected results of the distance measuring units 16, 17. FIG. 7 illustrates captured ranges of the imaging units 15 and detected ranges of the distance measuring units 16, 17 by the alternate long and two-short dashes lines; however, these are illustrative. The imaging units 15, the captured ranges, the distance measuring units 16, 17 and the detected ranges are not limited to the example shown in FIG. 7. In the drawings in FIG. 7 and FIG. 10, the arrow that indicates the forward side in the vehicle longitudinal direction is affixed to the vehicle 1; however, the arrow does not always indicate the traveling direction. The distance measuring units 17 are able to obtain detected results at the time when the vehicle 1 turns or reverses. The vehicle 1 may be referred to as host vehicle.

Next, an example of setting of a candidate position C by the candidate position setting unit 144 according to the present embodiment will be described with reference to FIG. 8 to FIG. 11. The target position determination unit 145 determines a target position from among at least one candidate position C set by the candidate position setting unit 144. That is, the target position determination unit 145 is able to determine a position set for the candidate position C as a target position but the target position determination unit 145 is not able to determine a position not set for the candidate position C as a target position. Thus, the following condition for setting a candidate position C is also a condition for setting a target position.

Figure 8:
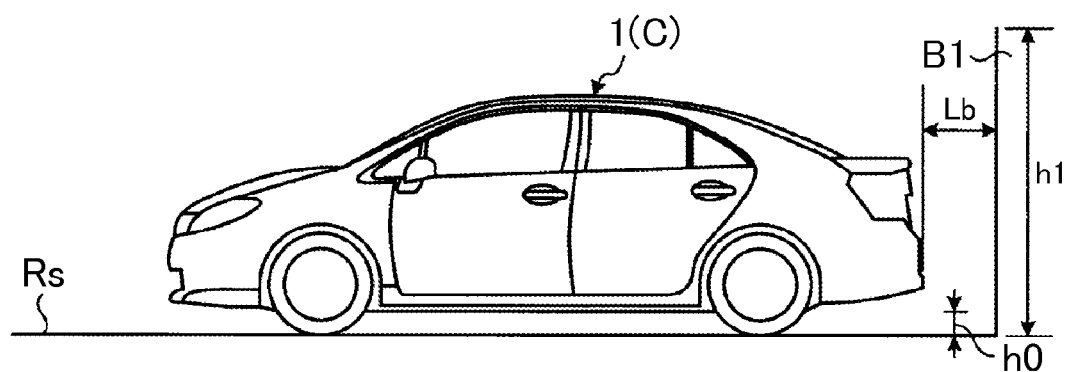
FIG. 8 is an exemplary side view that shows the vehicle and an obstacle detected by the parking assist system according to the embodiment.

As illustrated in FIG. 8, the candidate position setting unit 144 sets a candidate position C such that the vehicle 1 is spaced at least a predetermined distance Lb from an obstacle B1 of which a height h1 from a road surface Rs is higher than a threshold h0. The obstacle B1 is, for example, a wall, a fence, a pole, another vehicle, or the like. Thus, a situation in which the vehicle 1 interferes with the tall obstacle B1 is prevented. The threshold h0 is an example of a first threshold. The threshold h0 is, for example, set to a height at which an obstacle does not interfere with the lower portion of the vehicle body, except the wheels 3.

Figure 9:
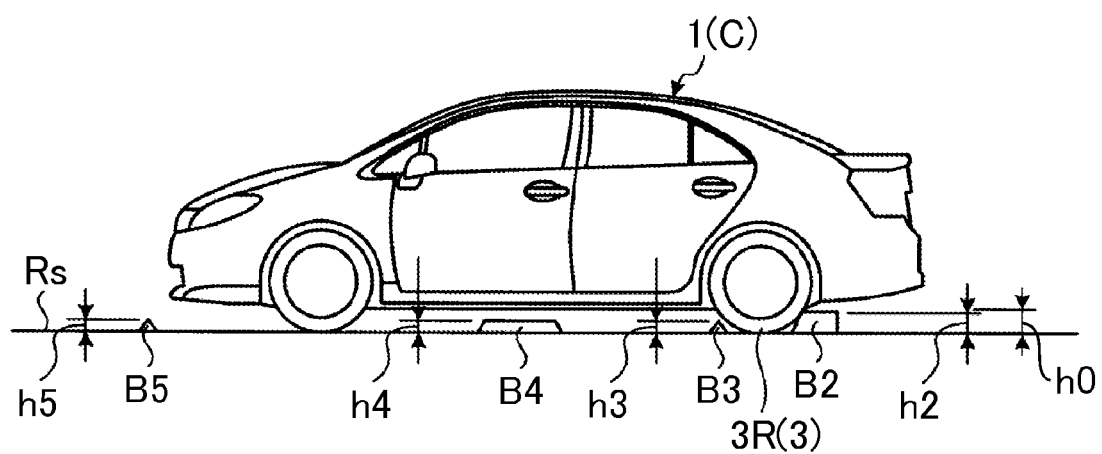
FIG. 9 is an exemplary side view that shows the vehicle and other obstacles detected by the parking assist system according to the embodiment.
Figure 11:
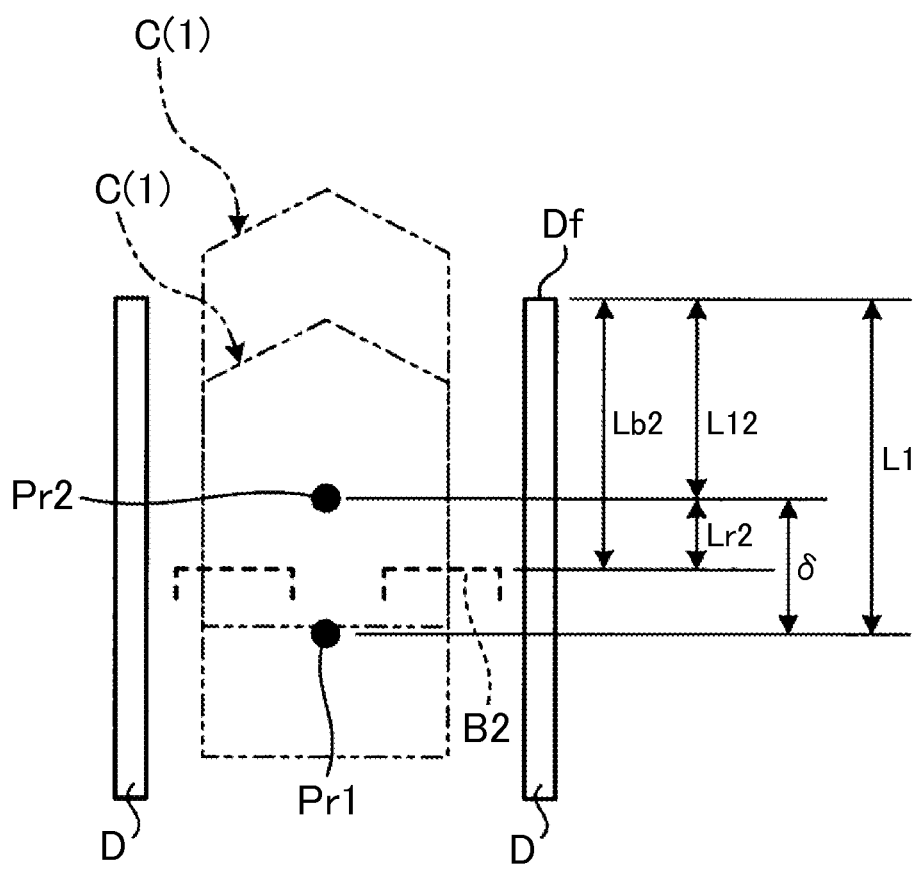
FIG. 11 is a schematic plan view of an example of a set candidate position of a target position and obstacles and parking boundaries detected by the parking assist system according to the embodiment.

As illustrated in FIG. 9, the candidate position setting unit 144 is able to set a candidate position C to a position at which the vehicle 1 overlaps with obstacles B2 to B5 of which heights h2 to h5 are lower than the threshold h0. The obstacle B2 is, for example, a sprag. The obstacle B3 is, for example, a protrusion. The obstacle B4 is, for example, an elevating plate for stopping a vehicle. The obstacle B5 is, for example, a protrusion. Thus, a candidate position C is set while avoiding the low obstacles B2 to B5, and a situation that a candidate position cannot be set at an originally available parking space or position is prevented.

FIG. 10 illustrates a plan view of a detected result of the parking assist system 100 of the vehicle 1 that travels in the traveling direction V. Mutually spaced two obstacles B and mutually spaced two parking boundaries D are detected. An entrance side of a parking space is the upper side in FIG. 10. FIG. 10 shows detected results at the time when the vehicle 1 passes by the upper side of FIG. 10 in the leftward direction (traveling direction V), so the obstacles B are, for example, detected in a downward-open inverted U shape in the drawing. Each of the obstacles B is an obstacle higher than the threshold h0. The parking boundaries D are detected from image data captured by the imaging units 15. An image of each parking boundary D is detected as a linear or band-shaped area. Detected results vary depending on settings of the distance measuring units 16, 17 and imaging units 15.

The candidate position setting unit 144 sets a limit line L of each obstacle B at a position spaced a predetermined distance d from the outer periphery of the corresponding obstacle B substantially along the outer periphery of the corresponding obstacle B. The candidate position setting unit 144 sets a candidate position C within an area across the limit lines L from the corresponding obstacles B. Thus, at least the certain distance d, that is, clearance, is ensured between each obstacle B and the vehicle 1 located at the candidate position C.

The candidate position setting unit 144 sets a candidate position C such that the candidate position C does not overlap with the parking boundaries D. That is, a candidate position C is set in an area that does not overlap with the parking boundaries D, that is, an area out of the parking boundaries D, within an intended area (an area allowed to be set).

The candidate position setting unit 144 determines a candidate position C in the longitudinal direction of the vehicle 1 on the basis of the detected obstacles B and parking boundaries D. Hereinafter, for the sake of convenience of description, a direction in which the parking boundaries D extend is simply referred to as longitudinal direction (vertical direction in FIG. 10), and a direction perpendicular to the direction in which the parking boundaries D extend is simply referred to as transverse direction (horizontal direction in FIG. 10). When the parking boundaries D have not been sufficiently detected, the candidate position setting unit 144 sets the longitudinal direction corresponding to the longitudinal direction of the vehicle 1 and the transverse direction corresponding to the width direction of the vehicle 1 on the basis of detected obstacles B, B2, B4, and the like, and executes a similar process to the following process.

When a front end Df, that is, an entrance-side end, of each parking boundary D has been detected, the candidate position setting unit 144, for example, sets a candidate position C such that a reference point Pr of the vehicle 1 is located at a position spaced a distance L1 from the front end Df in the longitudinal direction. When no parking boundary D has been detected and the obstacles B have been detected, it is possible to similarly set a candidate position C on the basis of the obstacles B. The reference point Pr is, for example, set at a center position between the rear wheels 3R of the vehicle 1.

When a rear end Dr, that is, back-side end, of each parking boundary D has been detected, the candidate position setting unit 144 is, for example, able to set a candidate position C such that the reference point Pr of the vehicle 1 is located at a position spaced a distance L2 from the rear end Dr in the longitudinal direction or a rear end Cr of the vehicle 1 is located at a position spaced a distance L3 from the rear end Dr in the longitudinal direction.

The heights h2, h4 of the obstacles B2, B4 are detected, and are lower than the threshold h0. In this case, the candidate position setting unit 144 is able to set a candidate position C to a position at which the vehicle 1 overlaps with these obstacles B2, B4.

The candidate position setting unit 144 is able to determine whether the vehicle 1 runs over the obstacles B2, B4 on the basis of relative positions of the obstacles B2, B4 with respect to the positions of the parking boundaries D or obstacles B that determine a parking space or an available parking space. In the example shown in FIG. 10, a distance Lb4 in the longitudinal direction from the front end Df of each parking boundary D to the obstacle B4 is shorter than the overall length of the vehicle 1, and is, for example, about half of the overall length. The obstacle B4 located at such a position is less likely to be a sprag. Thus, for the obstacle B4 of which a distance in the longitudinal direction from the front end Df of each parking boundary D falls within a range shorter than or equal to about two thirds of the length of the vehicle 1 and the height is lower than the threshold h0, the candidate position setting unit 144 is, for example, able to set a candidate position C on a side across the obstacle B4 from the entrance side, that is, the back side.

In the example of FIG. 10, a distance Lb2 from the front end Df of each parking boundary D to each obstacle B2 is a length close to the overall length of the vehicle 1. The obstacles B2 located at such a position are highly likely to be sprags. Thus, for the obstacles B2 of which a distance in the longitudinal direction from the front end Df of each parking boundary D falls within a range longer than or equal to about three quarters of the length of the vehicle 1 and the height is lower than the threshold h0, the candidate position setting unit 144 may set a candidate position C on the basis of the obstacles B2. Specifically, it is possible to set a candidate position C such that the reference point Pr of the vehicle 1 is located a distance Lr2 forward from each obstacle B2 in the longitudinal direction. The distance Lr2 is set on the basis of a value in a state where the rear wheels 3R of the vehicle 1 contact the front ends of sprags.

The candidate position setting unit 144 is able to set a position in the vehicle width direction with respect to the obstacle B4 over which the vehicle 1 runs. It is not desirable that the rear wheels 3R of the vehicle 1 pass over an end Be. When the end Be of the obstacle B4 in the vehicle width direction has been detected, the candidate position setting unit 144, for example, sets a candidate position C such that a distance Wbe in the transverse direction between the end Be and an end Ce of the vehicle 1 in the vehicle width direction falls within a predetermined range in which the rear wheels 3R do not overlap with the end Be or a distance Wb4 in the transverse direction between the end Be and the center line CL or reference point Pr of the vehicle 1 falls within a predetermined range in which the rear wheels 3R do not overlap with the end Be.

The candidate position setting unit 144 is able to set the position, that is, orientation Cv, of the vehicle 1 at the candidate position C. The candidate position setting unit 144 is, for example, able to detect an orientation at the candidate position C on the basis of at least one of the detected parking boundary D and the detected obstacle B. The orientation Cv may be, for example, set on the basis of the direction in which each parking boundary D extends, the direction along the limit line L, or the like.

The candidate position setting unit 144 is able to set a position, that is, orientation, with respect to the obstacles B2, B4 with which the vehicle 1 overlaps at the candidate position C. The obstacles B2, B4 are mostly installed in position corresponding to the parking space. For example, the front edge portions of the obstacles B2, B4 are mostly set so as to be perpendicular to the depth direction of the parking space. Thus, the candidate position setting unit 144 is able to set the orientation Cv on the basis of the directions detected for the obstacles B2, B4. In the example shown in FIG. 10, the candidate position setting unit 144 is, for example, able to set the orientation Cv such that the orientation Cv intersects with, for example, the orientation Cv is perpendicular to, straight lines B1 that are obtained through regression analysis, such as a method of least squares, on detected predetermined ranges of the front edges of the obstacles B2, B4. By setting the orientation Cv based on the detected obstacles B2, B4, such an advantageous effect that it is possible to set the orientation Cv, for example, even when the parking boundary D has not been sufficiently detected is obtained. For example, because the obstacles B2, B4 intersect with (the obstacles B2, B4 are perpendicular to) the orientation Cv, there is such an advantageous effect that inconvenience in the case where the wheels 3 run over the obstacle B4 or in the case where the wheels 3 contact the obstacles B2 reduces.

The candidate position setting unit 144 is, for example, able to set the orientation Cv by considering the direction in which each parking boundary D extends, the direction of the limit line L that is the direction in which the outer periphery of each obstacle B extends, the direction of each straight line B1 that is the direction in which the obstacles B2, B4 extend, and the like, by averaging these directions with weights assigned as needed. It is possible to change a method of calculating the orientation Cv depending on a detection situation, or the like, for example, a detected obstacle B is not used when the parking boundary D has been detected. The candidate position setting unit 144 is an example of a position determination unit.

There may be a case where the position of a reference point Pr1 of the vehicle 1 for the candidate position C calculated on the basis of the parking boundaries D and the position of a reference point Pr2 calculated on the basis of the obstacles B2 differ from each other. In the example shown in FIG. 11, the position of the reference point Pr1 that is calculated on the basis of the parking boundaries D is set to a position located the distance L1 from the front end Df of each parking boundary D toward the back side in the longitudinal direction. In contrast, the position of the reference point Pr2 that is calculated on the basis of the obstacles B2 is set to a position located the distance Lr2 from the obstacles B2 toward the entrance side in the longitudinal direction. When the distance toward the back side from each front end Df to each obstacle B2 is Lb2, a distance L12 toward the back side from each front end Df to the reference point Pr2 is L12=Lb2−Lr2, so a difference (error) δ in distance between the reference point Pr1 and the reference point Pr2 is δ=L1-L12. When the error δ is equal to or larger than a threshold δth, the candidate position setting unit 144 does not set a candidate position C. Thus, for example, a situation that the candidate position C is set to a position that deviates from the parking space may be prevented. The threshold δth is an example of a second threshold. The reference point Pr1 is an example of a first candidate position. The reference point Pr2 is an example of a second candidate position. The reference point Pr1 may be calculated from the detected obstacles B, B1 higher than the threshold h0.

Various detected results change as the vehicle 1 moves. For example, as the vehicle 1 approaches the parking space, a detection range becomes wider or detection accuracy increases. The target position determination unit 145 is able to update the target position and its orientation by performing similar calculation to that of the above-described candidate position setting unit 144 in the middle of movement of the vehicle 1 along the moving path to the target position determined from among the candidate positions C. When it is estimated that the vehicle 1 runs over the obstacle B4 on the basis of detected results of the sensors, and the like, commensurate with the traveling state of the vehicle 1 and the operation state of the accelerator operation unit 5, a target position at which the vehicle 1 runs over the obstacle B4 may be determined.

As described above, in the present embodiment, for example, the candidate position setting unit 144 is able to set the candidate position C such that the vehicle 1 is spaced at least the predetermined distance Lb from the obstacle B1 higher than the threshold h0, and is able to set the target position C at a position at which the vehicle 1 overlaps with the obstacles B2 to B5 lower than the threshold h0. Thus, according to the present embodiment, for example, even in a situation that there are the low obstacles B2 to B5 within the parking space, the target position may be determined at a less inconvenient position.

In the present embodiment, for example, the candidate position setting unit 144 is able to set the candidate position C at a position set in correspondence with the position of each obstacle B2 lower than the threshold h0. Thus, for example, there are the obstacles B2, such as sprags, of which an approximate position is known in correspondence with the parking space, the target position may be determined at a less inconvenient position on the basis of the detected obstacles B2.

In the present embodiment, for example, the candidate position setting unit 144 is able to set the candidate position C at a position set in correspondence with the positions of the obstacles B2, B4 lower than the threshold h0 in the middle of movement of the vehicle 1 along the moving path. Thus, for example, the target position may be determined at a less inconvenient position on the basis of the detected result in the middle of the moving path.

In the present embodiment, for example, the candidate position setting unit 144 (position determination unit) determines the orientation Cv at the candidate position C such that the orientation Cv is set in position that intersects with the directions of the obstacles B2, B4 lower than the threshold h0. Thus, for example, the target position may be determined at a less inconvenient position on the basis of the directions of the obstacles B2, B4.

In the present embodiment, for example, when a distance between the reference point Pr1 (first candidate position) and the reference point Pr2 (second candidate position) is longer than or equal to the threshold δth, no target position is determined. The reference point Pr1 (first candidate position) is based on at least one of the detected result of the parking space detection unit 143 or the detected result of the obstacle detection unit 142 for the obstacles B, B1 higher than the threshold h0. The reference point Pr2 (second candidate position) is a position set in correspondence with the obstacles B2, B4 lower than the threshold h0 among the detected results of the obstacle detection unit 142. Thus, for example, a situation that the target position is determined at a position out of the parking space may be prevented.

In the present embodiment, a parking assist method includes: detecting an obstacle; determining a target position C of a moving path of the vehicle 1; and determining a candidate position C at a position at which the vehicle 1 is spaced at least the predetermined distance Lb from the obstacle B1 higher than the threshold h0 and the vehicle 1 overlaps with the obstacles B2 to B5 lower than the threshold h0. Thus, for example, even in a situation that there are low obstacles B2 to B5 within the parking space, the target position may be determined at a less inconvenient position.

The embodiment of the invention is illustrated above; however, the above-described embodiment is illustrative, and is not intended to limit the scope of the invention. The embodiment may be implemented in other various forms, and may be variously omitted, replaced, combined or changed without departing from the spirit of the invention. The components and shapes of each embodiment may be partially replaced. The specifications (structure, type, orientation, shape, size, length, width, height, number, arrangement, position, and the like) of each component, or the like, may be changed as needed. The invention is applicable to parking assist in parking places and parking spaces in various forms. The way of detecting or the way of setting the position and orientation of the vehicle and the candidate position and its orientation, bases for the position and orientation of the vehicle and the candidate position and its orientation, or the like, may be variously set or changed. An input signal may be based on an audio input to a microphone.

What is claimed is:

1. A parking assist system comprising:
    an electronic control unit;
    at least one imaging unit provided on a body of a vehicle, the at least one imaging unit being connected with the electronic control unit, the at least one imaging unit being configured to capture image data around at least a portion of the vehicle; and
    at least one distance measuring unit provided on the body of the vehicle, the at least one distance measuring unit being connected with the electronic control unit, the at least one distance measuring unit being configured to detect obstacles around at least a portion of the vehicle,
    wherein the electronic control unit is configured to:
    detect at least one obstacle based on image data captured by the at least one imaging unit and detection results from the at least one distance measuring unit,
    determine a target position of a moving path of the vehicle, and
    determine the target position at a position at which the vehicle is spaced at least a predetermined distance from an obstacle of the at least one obstacle that is higher than a first threshold and the vehicle overlaps with an obstacle of the at least one obstacle that is lower than the first threshold.

2. The parking assist system according to claim 1, wherein the electronic control unit is configured to determine the target position at a position set in correspondence with a position of the obstacle lower than the first threshold.

3. The parking assist system according to claim 2, wherein the electronic control unit is configured to, in the middle of the moving path of the vehicle, determine the target position at a position set in correspondence with the position of the obstacle lower than the first threshold.

4. The parking assist system according to claim 3, wherein the electronic control unit is configured to determine an orientation of the vehicle at the target position such that the orientation of the vehicle intersects with a direction in which the obstacle lower than the first threshold extends.

5. The parking assist system according to claim 4, wherein the electronic control unit is configured to detect a parking space that is defined by a mark or an object, and
    the electronic control unit is configured to, when a distance between a first candidate position of the target position and a second candidate position of the target position is longer than or equal to a second threshold, skip determining the target position, the first candidate position is based on at least one of the detected parking space or the detected obstacle higher than the first threshold, and the second candidate position is the position set in correspondence with the position of the obstacle lower than the first threshold.

6. The parking assist system according to claim 3, wherein the electronic control unit is configured to detect a parking space that is defined by a mark or an object, and
    the electronic control unit is configured to, when a distance between a first candidate position of the target position and a second candidate position of the target position is longer than or equal to a second threshold, skip determining the target position, the first candidate position is based on at least one of the detected parking space or the detected obstacle higher than the first threshold, and the second candidate position is the position set in correspondence with the position of the obstacle lower than the first threshold.

7. The parking assist system according to claim 2, wherein the electronic control unit is configured to determine an orientation of the vehicle at the target position such that the orientation of the vehicle intersects with a direction in which the obstacle lower than the first threshold extends.

8. The parking assist system according to claim 7, wherein the electronic control unit is configured to detect a parking space that is defined by a mark or an object, and
    the electronic control unit is configured to, when a distance between a first candidate position of the target position and a second candidate position of the target position is longer than or equal to a second threshold, skip determining the target position, the first candidate position is based on at least one of the detected parking space or the detected obstacle higher than the first threshold, and the second candidate position is the position set in correspondence with the position of the obstacle lower than the first threshold.

9. The parking assist system according to claim 2, wherein the electronic control unit is configured to detect a parking space that is defined by a mark or an object, and the electronic control unit is configured to, when a distance between a first candidate position of the target position and a second candidate position of the target position is longer than or equal to a second threshold, skip determining the target position, the first candidate position is based on at least one of the detected parking space or the detected obstacle higher than the first threshold, and the second candidate position is the position set in correspondence with the position of the obstacle lower than the first threshold.

10. A parking assist method comprising:

providing a vehicle with an electronic control unit, at least one imaging unit connected with the electronic control unit and configured to capture image data around at least a portion of the vehicle, and at least one distance measuring unit connected with the electronic control unit and configured to detect obstacles around at least a portion of the vehicle;

detecting an obstacle using the electronic control unit based on image data captured by the at least one imaging unit and detection results from the at least one distance measuring unit;

determining a target position of a moving path of the vehicle; and determining the target position at a position at which the vehicle is spaced at least a predetermined distance from an obstacle of the at least one obstacle that is higher than a first threshold and the vehicle overlaps with an obstacle of the at least one obstacle that is lower than the first threshold.

* * * * *